United States Patent [19]
Klein

[11] Patent Number: 6,119,197
[45] Date of Patent: Sep. 12, 2000

[54] METHOD FOR PROVIDING AND OPERATING UPGRADEABLE CACHE CIRCUITRY

[75] Inventor: Dean A. Klein, Eagle, Id.

[73] Assignee: Micron Technology, Inc., Boise, Id.

[21] Appl. No.: 09/158,179

[22] Filed: Sep. 21, 1998

Related U.S. Application Data

[63] Continuation of application No. 08/961,698, Oct. 31, 1997, Pat. No. 5,829,036.

[51] Int. Cl.[7] ..................................................... G06F 12/08
[52] U.S. Cl. ............................... 711/2; 711/141; 711/122; 711/3; 711/144; 711/170; 710/13
[58] Field of Search ..................................... 711/119, 122, 711/124, 141, 143, 146, 1, 2, 3, 5, 115, 170, 171, 172, 173, 201, 144; 395/830, 833, 281, 284

[56] References Cited

U.S. PATENT DOCUMENTS

| | | | |
|---|---|---|---|
| 4,575,792 | 3/1986 | Keeley | 714/42 |
| 4,654,787 | 3/1987 | Finnell et al. | 711/172 |
| 4,787,060 | 11/1988 | Boudreau et al. | 711/172 |
| 5,265,232 | 11/1993 | Gannon et al. | 711/124 |
| 5,446,860 | 8/1995 | Dresser et al. | 711/100 |
| 5,455,925 | 10/1995 | Kitahara et al. | 711/122 |
| 5,539,912 | 7/1996 | Clarke, Jr. et al. | 710/104 |
| 5,586,270 | 12/1996 | Rotier et al. | |
| 5,604,871 | 2/1997 | Pecone | |
| 5,604,875 | 2/1997 | Munce et al. | |
| 5,638,506 | 6/1997 | Peterson et al. | 714/8 |
| 5,640,531 | 6/1997 | Whittaker et al. | 711/118 |
| 5,666,321 | 9/1997 | Schaefer | 365/233.5 |
| 5,677,890 | 10/1997 | Liong et al. | 365/229 |
| 5,784,548 | 7/1998 | Liong et al. | 714/6 |
| 5,881,254 | 3/1999 | Corrigan et al. | 710/129 |

OTHER PUBLICATIONS

Intel Corporation, "Coast 3.1, Flexible Cache Solution for the Intel 430FX, 430HX and 430VX PCIset," pp. 1–41, Jun. 10, 1996.

"Secondary Cache Daughterboard Assembly for 486/386–Based Personal Computers", IBM TDB, pp. 225–226.

*Primary Examiner*—B. James Peikari
*Attorney, Agent, or Firm*—Dorsey & Whitney LLP

[57] ABSTRACT

An upgradeable cache circuit is described which automatically routes those control signals necessary to maintain cache coherency in a computer system having a processor (with integrated L1 cache) coupled with main memory by a controller. The cache circuit includes an L2 cache module connector and a high speed multiplexer having minimal propagation delay. The multiplexer selects one of two sets of control signals to route to and from the processor, controller and cache circuit, corresponding to the presence or absence of an L2 cache module in the cache module connector.

29 Claims, 2 Drawing Sheets

METHOD FOR PROVIDING AND OPERATING UPGRADEABLE CACHE CIRCUITRY

CROSS-REFERENCE TO RELATED APPLICATION

This application is a continuation of U.S. Patent application No. 08/961,698, filed Oct. 31, 1997, now U.S. Pat. No. 5,829,036.

TECHNICAL FIELD

This invention relates generally to operating computer systems, and more particularly to operating cache memory modules used in computer systems.

BACKGROUND OF THE INVENTION

In today's computer systems, the speed of microprocessors has outstripped the speed of typical main memory DRAM systems. When a processor accesses main memory, the processor remains idle for a number of clock cycles, thus wasting precious time. In order to provide as many zero wait state memory accesses as possible, while maintaining a reasonable system cost, many of today's computer systems provide a high speed SRAM cache module. The faster and more expensive SRAM contains a subset of the slower and less expensive DRAM contents. The memory cache contains copies of data lines from main memory, each line including multiple bytes of data or program instructions (collectively referred to as "data").

When the microprocessor initiates a memory cycle (read or write), the cache module determines whether it contains a copy of a data line having data at the memory location specified by the microprocessor. If a copy resides in the cache (a cache hit), the microprocessor can achieve a zero wait state memory access. If a copy does not reside in the cache (a cache miss), a main memory access occurs, and the microprocessor remains idle for a number of clock cycles. As the processor operates, the cache contents are regularly changed to include copies of memory lines recently requested by the microprocessor (temporal locality) and to include memory lines in memory locations consecutive to those recently requested (spatial locality).

In the case of a write operation to a memory location having data copied in the cache (a cache write hit), the cache memory is updated, and main memory is then said to contain stale information. The cache line is said to be modified, or dirty, because it is no longer a duplicate of the corresponding line in memory. If main memory is not updated and another bus master (such as a DMA or SCSI controller) accesses main memory, data consistency/coherency problems may result.

Variations on two distinct write policies are employed to prevent data coherency problems. One is called a write-through policy, in which the cache immediately passes each write operation initiated by the microprocessor through to main memory. Even in the case of a cache write hit, both the cache line and the corresponding line in main memory are updated, thereby ensuring consistency between the cache and main memory. The write-through policy is simple to implement, but has the performance limitations associated with each write operation requiring access to the slow main memory.

A second write policy is called a write-back policy, in which main memory is updated only when necessary. This keeps the system bus free for use by other bus masters and is particularly advantageous when significant system I/O activity is expected. Main memory is updated when (1) a bus master other than the microprocessor initiates a read access to a memory line which contains stale data; (2) a bus master other than the microprocessor initiates a write access to a memory line which contains stale data; and (3) a modified cache line is about to be overwritten to store a copy of a memory line newly requested by the microprocessor. When a bus master other than the microprocessor initiates a memory cycle, the cache module must monitor, or snoop, the system bus to check for memory accesses to lines marked as modified in the cache.

Many of today's microprocessors include an SRAM cache internal to the microprocessor chip. Such a cache is called an L1 cache. Computer system designers may still provide a supplementary external cache, called an L2 cache, to further increase system performance. Maintaining coherency amongst the various caches and main memory is correspondingly more complex than for the exemplary single cache system discussed above, particularly when one or more of the caches employs a write-back policy.

It is oftentimes desirable to allow an end user or manufacturer to decide whether to include the external L2 cache as an upgrade to the computer system. In such a case, the system designer provides a connector for an optional cache module. This reduces manufacturing costs, since a single system board can be used for computer systems with or without an external L2 cache. However, the various control signals necessary to maintain cache coherency must then be routed differently, depending on whether the optional L2 cache module is included. Currently, the alternative routing of the control signals is accomplished with jumpers, which must be physically connected according to whether the L2 cache module upgrade is included. The use of jumpers can be quite inconvenient, particularly for an end user of modest technical sophistication.

SUMMARY OF THE INVENTION

According to the present invention, a user-friendly upgradeable cache circuit is provided which automatically routes those control signals necessary to maintain cache coherency. The cache circuit includes a cache module connector and a high speed multiplexer having minimal propagation delay. The multiplexer selects one of two sets of control signals corresponding to the presence or absence of a cache module in the cache module connector.

A computer circuit is provided which includes a controller coupling a processor with main memory. The main memory stores data, and the processor includes an internal cache which stores a subset of the data stored in main memory. The cache circuit is coupled with the processor and with the controller, and includes cache connecting circuitry and switching circuitry. The cache connecting circuitry can receive an optional external cache module and produces a detect signal having a state which indicates whether the external cache module is employed. The switching circuitry responds to the detect signal and inputs to the processor one of two cache inquire signals, depending on the state of the detect signal. One of the cache inquire signals is produced by the controller, and the other is produced by the cache connecting circuitry. The switching circuitry also responds to the detect signal to input to the controller one of two cache content signals, depending on the state of the detect signal. One of the cache content signals is produced by the processor, and the other is produced by the cache connecting circuitry.

A method is provided for controlling cache coherency inquire and write-back cycles in a computer circuit having a controller coupling a processor with a main memory. The processor includes an internal cache, and a cache circuit capable of receiving an optional external cache module is coupled with the controller and the processor. A detect signal is produced. The detect signal has a state which indicates whether the optional external cache module has been employed. First and second cache inquire signals are produced which, when asserted and input to the processor, initiate a cache coherency inquire cycle. Depending on the state of the detect signal, a corresponding one of the first and second cache inquire signals is input to the processor. Also, first and second cache content signals are produced which, when asserted and input to the controller, initiate a cache write back cycle. Depending on the state of the detect signal, a corresponding one of the first and second cache content signals is input to the controller.

DETAILED DESCRIPTION OF SPECIFIC EMBODIMENTS

A user-friendly upgradeable cache circuit is described which automatically routes certain control signals to maintain cache coherency. In the following description, specific details are set forth, such as specific microprocessor, multiplexer and circuit element types, in order to provide a thorough understanding of the preferred embodiment of the present invention. It will be obvious, however, to one skilled in the art that the present invention may be practiced without these details. In other instances, well-known circuits have not been shown in detail in order not to unnecessarily obscure the invention. Also not presented are other well-known control signals and timing protocols associated with cache coherency inquire cycles.

Figure 1:
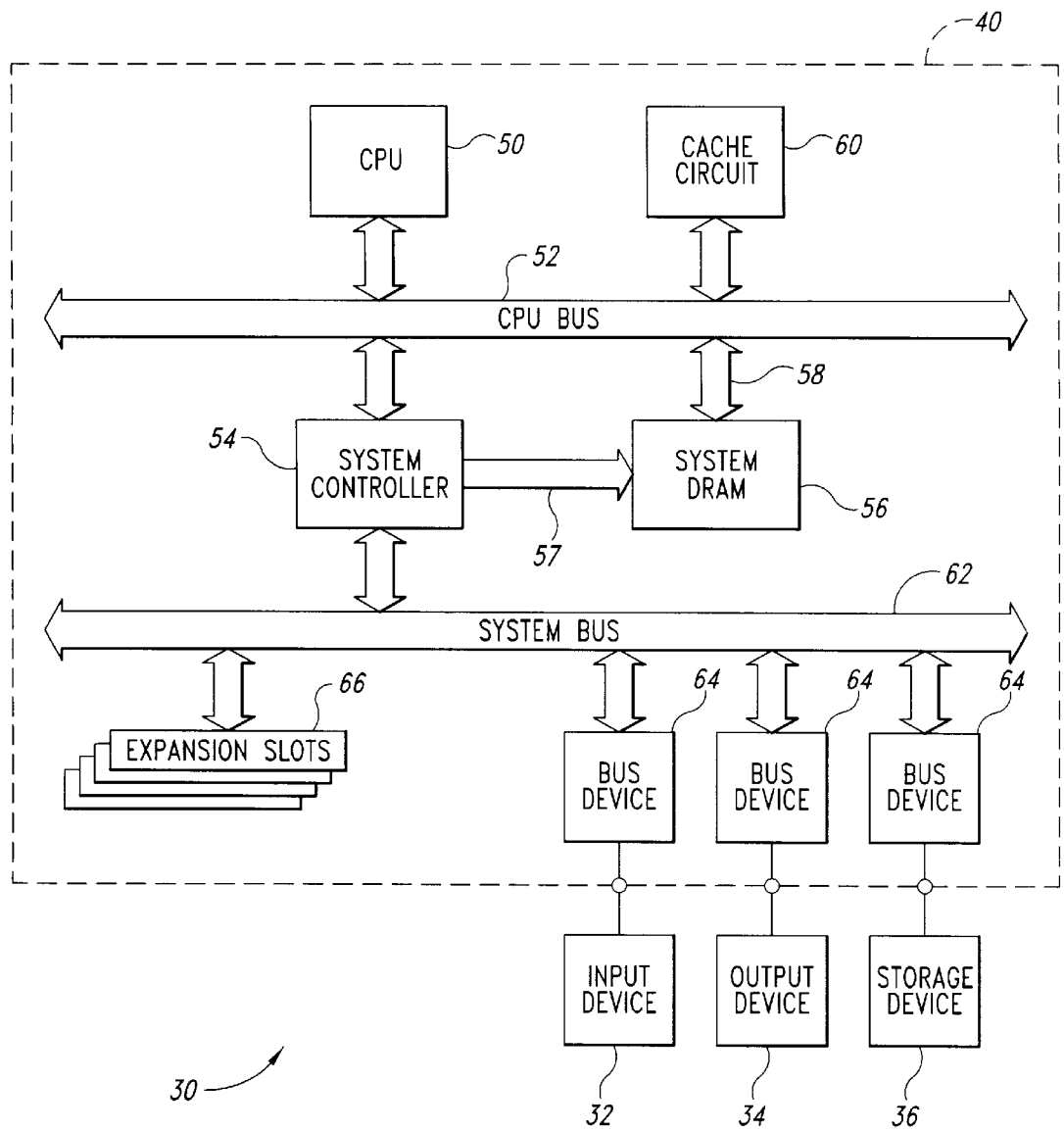
FIG. 1 is a block diagram of a computer system having a cache circuit according to the present invention.

FIG. 1 is a block diagram of a computer system 30 according to the present invention. One or more input devices 32, such as a keyboard or a pointing device, is coupled to computer circuitry 40 and allows an operator (not shown) to manually input data thereto. One or more output devices 34 is coupled to the computer circuitry 40 to provide data generated by the circuitry to the operator. Examples of output devices 34 include a printer and a video display unit. One or more data storage devices 36 is coupled to the computer circuitry 40 to store data on or retrieve data from external storage media (not shown). Examples of storage devices 36 and associated storage media include drives that accept hard and floppy disks, magnetic tape recorders, and compact-disc read only memory (CD-ROM) readers.

The computer circuit 40 includes an upgradeable cache circuit 60 according to the present invention. A microprocessor 50, such as the Pentium™ processor, is connected to a CPU bus 52 which carries address, data and control signals. The CPU bus 52 is in turn connected to a system controller 54, which acts as a memory controller accessing a main memory system DRAM 56 via a memory address and control bus 57. The data portion of the CPU bus 52 is coupled with the system DRAM 56 by a memory data bus 58. The upgradeable cache circuit 60 is connected to the CPU bus 52. As explained in detail below, the cache circuit 60 provides the option of including an external L2 cache module (not shown) in the system.

The system controller 54 also serves as a bridge circuit between the CPU bus 52 and a system bus 62. The system bus 62 may itself be a combination of one or more bus systems with associated interface circuitry (e.g., PCI bus with connected SCSI and ISA bus systems). Connected to the system bus are multiple bus devices 64 and expansion slots 66. Well-known examples of bus devices include a floppy disk drive circuitry module with DMA controller, a CD ROM drive circuitry module with SCSI controller, a VGA controller for connecting to an output device 34 such as a video display unit, an IDE interface module for connecting to a storage device 36 such as a hard disk drive, and a keyboard/mouse controller for connecting to an input device 32 such as a keyboard or pointing device. The expansion slots 66 provide future accommodation of other bus devices not selected during the original design of the computer system.

Microprocessors such as the Pentium™ processor include an integrated L1 data cache. As described above, maintaining the coherency of cache and system main memory is desirable for proper system performance. In the case where no L2 cache module is connected to the cache circuit 60, it is a matter of maintaining L1 cache coherency. When a bus master other than the microprocessor 50 (such as a DMA or SCSI controller) initiates a memory cycle, an inquire cycle is first performed in which the microprocessor 50 determines whether the addressed location in the system DRAM 56 is copied in the L1 cache. As is well known for the exemplary Pentium™ processor 50, inquire cycles can be performed when the microprocessor is forced off the CPU bus 52 by asserting either of the BOFF# ("Back Off," asserted low as indicated by the "#" label)) and A HOLD ("Address Hold," asserted high as indicated by the absence of the "#" label) signals output by the system controller 54 and input to the microprocessor. The inquire cycle is then performed by placing an inquire address on the address portion of the CPU bus 52 and asserting the EADS# ("External Address Strobe")signal. If a cache hit to a modified line occurs, the Pentium# processor 50 outputs a signal known as HITM# ("Hit Modified Line") which is input to the system controller 54. A modified line must then be written back to the system DRAM 56 before providing the data to the requesting bus master (alternatively, the data may be provided directly from the cache).

In the case where an external L2 cache module is connected to the cache circuit 60, maintaining cache coherency requires a rerouting of certain of the control signals. For purposes of routing these control signals, the L2 cache module is functionally interposed between the microprocessor 50 and the system controller 54. As such, the L2 cache module provides the signal to initiate inquire cycles by the Pentium™ processor 50 and provides to the system controller 54 a signal which indicates whether a cache hit to a modified line occurs in either of the L1 or L2 caches.

Figure 2:
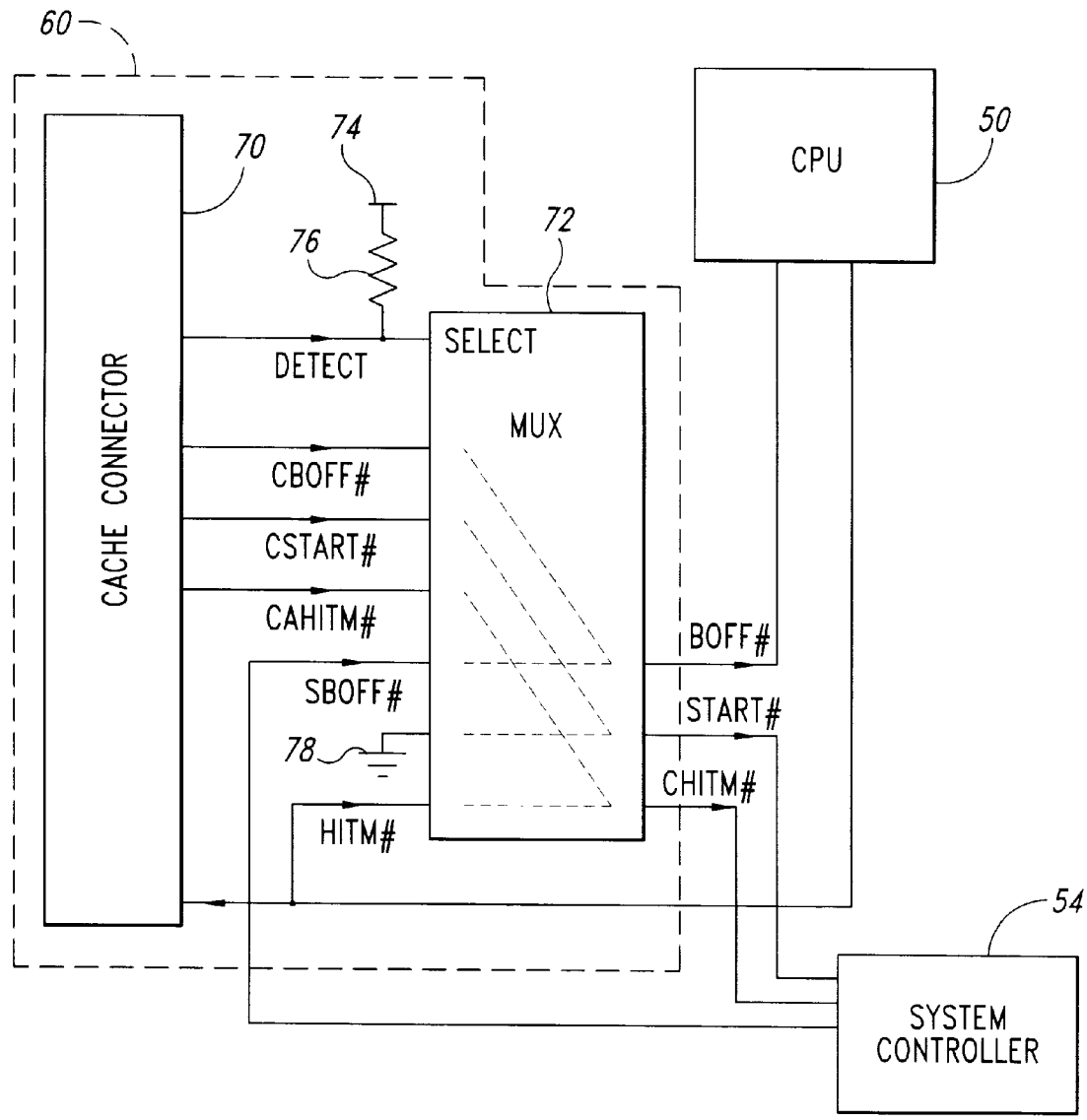
FIG. 2 is a part block, part schematic, diagram showing details of the cache circuit of FIG. 1.

Referring to FIG. 2, details of the cache circuit 60 are described. Those skilled in the art will appreciate that numerous address, data and control signal lines are not shown in order not to unnecessarily obscure the description of the embodiment of the invention. The cache circuit 60 includes a cache connector 70 and a high speed multiplexer or mux 72, such as a QuickSwitch® QS3257, available from Quality Semiconductor, Inc. When an optional L2 cache module (not shown) is plugged into the cache connector 70, a DETECT signal is pulled low. The DETECT signal serves as a select signal input to the mux 72. In the absence of the L2 cache module, the DETECT signal is held high by the combination of a high supply voltage 74 and resistor 76.

When the DETECT signal is held high, the mux 72 selects a SBOFF# ("System Backoff") signal to pass to the Pentium™ processor 50 as the BOFF# input signal. Thus, the system controller 54 is able to initiate the cache coherency inquire cycles. When the DETECT signal is high, the mux 72 also passes the HITM# output from the Pentium™ processor 50 to the system controller 54 as a CHITM# ("Cache Hit Modified Line") input signal. The state of the CHITM# signal indicates to the system controller 54 whether the Pentium™ L1 cache has a modified line corresponding to the memory location addressed by a bus master other than the Pentium™ processor. Also, the mux 72 passes a low supply voltage 78 to the system controller 54 as a START# input signal. An asserted START# signal indicates an L2 cache miss to the system controller 54, which then starts a main memory access cycle (assuming an L1 cache miss). Thus, in the absence of an L2 cache module in the cache connector 70, all cache inquire cycles result in an L2 cache miss.

When the DETECT signal is pulled low by the presence of an L2 cache module (not shown) in the cache connector 70, the mux 72 selects a CBOFF# ("Cache Backoff") signal to pass to the Pentium™ processor 50 as the BOFF# input signal. In other words, the L2 cache module is now able to initiate the cache coherency inquire cycles. The L2 cache module receives the HITM# signal output from the Pentium™ processor 50 and provides a CAHITM# output signal. The mux 72 passes the CAHITM# signal to the system controller 54 as the CHITM# input signal. The state of the CHITM# signal indicates to the system controller 54 whether either of the L1 or L2 caches has a modified line corresponding to the memory location addressed by a bus master other than the Pentium™ processor. Also, the mux 72 passes a CSTART# signal to the system controller 54 as the START# input signal, indicating whether an L2 cache miss/hit has occurred.

When no optional L2 cache module is present, the mux 72 provides a cache coherency cycle in which the Pentium™ processor 50 and system controller 54 are coupled just as in a system originally designed without an L2 cache. If instead an optional L2 cache module is plugged into the cache connector 70, the mux 72 provides a cache coherency cycle in which the L2 cache module is functionally interposed between the Pentium™ processor 50 and system controller 54, just as in a system originally designed to have an L2 cache. Thus, the cache circuit 60 of the present invention provides a convenient circuit for accommodating an optional L2 cache module in a computer system design. Unlike currently available circuits for optional cache modules, the user-unfriendly setting of jumpers is not required.

Currently available circuits require that processor signals BOFF# and HITM# (as well as the corresponding system controller and cache module signals described above) be routed by jumpers. Although jumpers provide minimal propagation delay connections, an end user of modest technical sophistication has great difficulty upgrading current computer systems. In contrast, the present invention provides a user-friendly automatic routing of the requisite control signals, and no setting of jumpers is required to upgrade a computer system. Also, a high speed mux such as the preferred QS3257 QuickSwitch® (& has essentially zero propagation delay and so, like jumpers, does not interfere with the precise timing and high speed signal propagation required by today's microprocessors.

It will be appreciated that, although an embodiment of the invention has been described above for purposes of illustration, various modifications may be made without deviating from the spirit and scope of the invention. For example, the present invention has been described as switching signals to provide the BOFF# input signal to a Pentium™ processor for initiating a cache coherency inquire cycle. However, those skilled in the art will appreciate that the present invention could instead switch signals appropriate to apply either of the well-known A HOLD or HLDA signals to the Pentium™ processor to initiate such an inquire cycle. Also, while particular processor and high speed multiplexer types have been specified, any of a variety of well-known processor and high speed switching circuits could be employed. In particular, a switched configuration of high speed pass transistors or transmission gates is a suitable substitute for the particular QuickSwitch® mux described. Those skilled in the art will also appreciate that the present invention teaches how other control signals between a computer system microprocessor and controller can be conveniently and appropriately rerouted, depending on the presence/absence of system upgrade modules. Numerous variations are well within the scope of this invention. Accordingly, the invention is not limited except as by the appended claims.

What is claimed is:

1. In a computer system having a processor coupled with a main memory, the main memory for storing data and the processor including an internal cache for storing a subset of the data, the computer system also having external cache connecting circuitry for receiving an external cache module, a method of controlling cache coherency, comprising:

producing a detect signal having a first state or a second state;

determining from the detect signal if the external cache module is present or absent, the detect signal having a first state when the external cache module is absent;

producing a cache coherency control signal;

in response to the detect signal having the first state, transmitting the cache coherency control signal along a first signal path; and in response to the detect signal having the second state, transmitting the cache coherency control signal along a second signal path.

2. The method of claim 1 wherein the act of determining if the external cache module is present comprises coupling a first signal to the external cache module through a first external terminal of the cache module and attempting to couple a signal derived from the first signal from the external cache module through a second external terminal of the cache module.

3. The method of claim 2 further comprising, before producing the cache coherency control signal, producing a signal forcing the processor to decouple itself from the main memory.

4. The method of claim 3 wherein the signal forcing the processor to decouple itself from the main memory comprises a backoff signal.

5. The method of claim 3 wherein the signal forcing the processor to decouple itself from the main memory comprises an address hold signal.

6. The method of claim 2 wherein the act of producing a cache coherency control signal comprises producing a hit modified line signal.

7. The method of claim 2 wherein the act of producing a cache coherency control signal comprises producing the cache coherency control signal from the processor in response to the detect signal having the first state, and producing the cache coherency control signal from the external cache module in response to the detect signal having the second state.

8. In a computer system having a processor coupled with a main memory, the main memory for storing data and the processor including an internal cache for storing a subset of the data, the computer system also having external cache connecting circuitry for receiving an external cache module, a method of controlling cache coherency, comprising:

producing a detect signal having a first state or a second state, the detect signal having the first state when the external cache module is absent;

in response to the detect signal having the first state, transmitting the cache coherency control signal along a first signal path; and in response to the detect signal having the second state, transmitting the cache coherency control signal along a second signal path.

9. The method of claim 8 wherein the act of producing the detect signal comprises coupling a first signal to the external cache module through a first external terminal of the cache module and attempting to couple a signal derived from the first signal from the external cache module through a second external terminal of the cache module, the signal derived from the first signal corresponding to the detect signal.

10. The method of claim 8 further comprising, before producing a cache coherency control signal, producing a signal forcing the processor to decouple itself from the main memory.

11. The method of claim 10 wherein the signal forcing the processor to decouple itself from the main memory comprises a backoff signal.

12. The method of claim 10 wherein the signal forcing the processor to decouple itself from the main memory comprises an address hold signal.

13. The method of claim 8 wherein the act of producing a cache coherency control signal comprises producing a hit modified line signal.

14. The method of claim 8 wherein the act of producing a cache coherency control signal comprises producing the cache coherency control signal from the processor in response to the detect signal having the first state, and producing the cache coherency control signal from the external cache module in response to the detect signal having the second state.

15. In a computer system having a processor coupled with a main memory, the main memory for storing data and the processor including an internal cache for storing a subset of the data, the computer system also having external cache connecting circuitry for receiving an external cache module, a method of controlling cache coherency, comprising:

determining if the external cache module is present or absent;

in response to determining if the external cache module is absent, transmitting the cache coherency control signal along a first signal path; and in response to determining if the external cache module is present, transmitting the cache coherency control signal along a second signal path.

16. The method of claim 15 wherein the act of determining if the external cache module is present or absent comprises coupling a first signal to the external cache module through a first external terminal of the cache module and attempting to couple a detect signal derived from the first signal from the external cache module through a second external the cache module.

17. A The method of claim 15 further comprising, before producing the cache coherency control signal, producing a signal forcing the processor to decouple itself from the main memory.

18. The method of claim 17 wherein the signal forcing the processor to decouple itself from the main memory comprises a backoff signal.

19. The method of claim 17 wherein the signal forcing the processor to decouple itself from the main memory comprise a address hold signal.

20. The method of claim 15 wherein the act of producing a cache coherency control signal comprises producing a hit modified line signal.

21. The method of claim 15 wherein the act of producing a cache coherency control signal comprises producing the cache coherency control signal from the processor if the external cache module is absent and producing the cache coherency control signal from the external cache module if the external cache module is present.

22. In a computer system having a processor coupled with a main memory, the main memory for storing data and the processor including an internal cache for storing a subset of the data, the computer system also having external cache connecting circuitry for receiving an external cache module, a method of controlling cache coherency, comprising:

determining if the external cache module is present or absent;

producing a cache coherency inquire signal;

in response to determining that the external cache module is absent, transmitting the cache coherency inquire signal along a first signal path; and in response to determining that the external cache module is present, transmitting the cache coherency inquire signal along a second signal path.

23. The method of claim 22 wherein the act of determining if the external cache module is present or absent comprises coupling a first signal to the external cache module through a first external terminal of the cache module and attempting to couple a detect signal derived from the first signal from the external cache module through a second external terminal of the cache module.

24. The method of claim 22 further comprising, after producing the cache coherency inquire signal, producing a cache coherency control signal.

25. The method of claim 24 wherein the act of producing the cache coherency control signal comprises producing a hit modified line signal.

26. The method of claim 22 wherein the cache coherency inquire signal comprises a signal forcing the processor to decouple itself from the main memory.

27. The method of claim 26 wherein the signal forcing the processor to decouple itself from the main memory comprises a backoff signal.

28. The method of claim 26 wherein the signal forcing the processor to decouple itself from the main memory comprises an address hold signal.

29. The method of claim 22 wherein the act of producing the cache coherency inquire signal comprises producing the cache coherency inquire signal from a system controller if the external cache module is absent and producing the cache coherency inquire signal from the external cache module if the external cache module is present.

\* \* \* \* \*

UNITED STATES PATENT AND TRADEMARK OFFICE
CERTIFICATE OF CORRECTION

PATENT NO.    : 6,119,197
DATED         : September 12, 2000
INVENTOR(S)   : Dean A. Klein It is certified that error appears in the above-identified patent and that said Letters Patent is hereby corrected as shown below:

Column 7,
Line 66, reads: "external the cache" should read: -- external terminal of the cache --

Column 8,
Line 10-11, reads "memory comprise a address" should read: -- memory comprises an address --

Signed and Sealed this

Twenty-ninth Day of January, 2002

*Attest:*

*Attesting Officer*

JAMES E. ROGAN
*Director of the United States Patent and Trademark Office*